United States Patent Office 2,798,764
Patented July 9, 1957

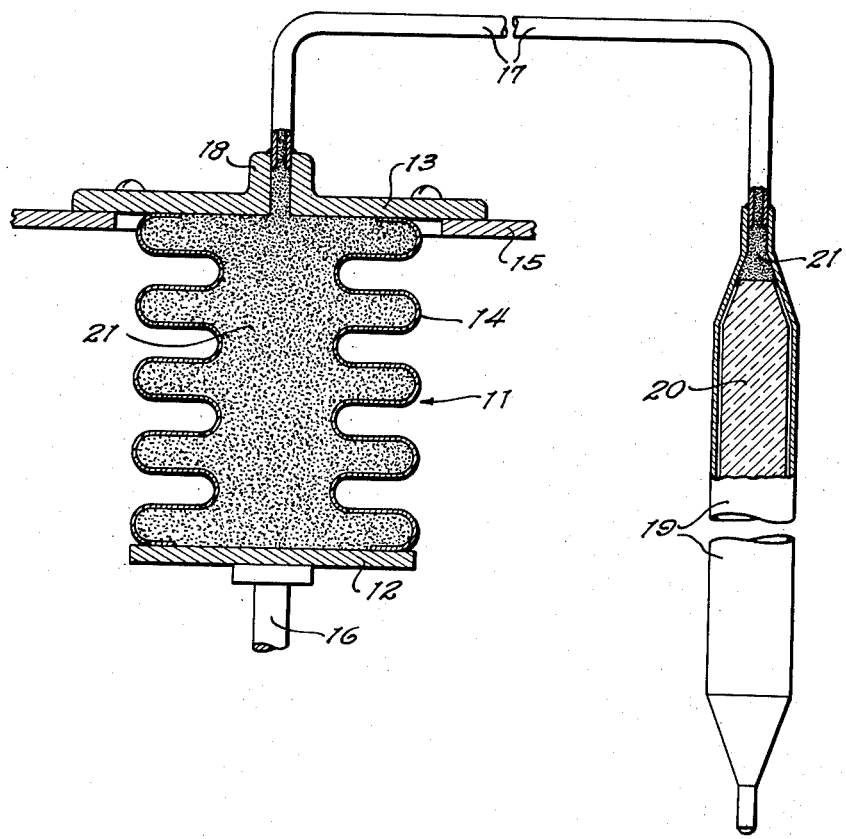

2,798,764

THERMOSTATIC CONTROL SYSTEM

William A. Ray, North Hollywood, Calif., assignor to General Controls Co., Glendale, Calif., a corporation of California Application January 2, 1953, Serial No. 329,377

2 Claims. (Cl. 297—8)

This invention relates to thermostatic control systems of the fluid-pressure operated type which comprise means forming a work chamber having a wall mounted by means such as a bellows or diaphragm so that it can move in response to variation of pressure in the chamber; and a thermal bulb, adapted to be subjected to the controlling temperature, connected to the work chamber so as to form therewith a closed pressure system.

Conventional pressure systems of this type are charged or filled with a fluid whose expansion and contraction in response to variation of temperature at the thermal bulb effects corresponding movement of the work-chamber wall to actuate a control device such as a switch or valve. When such a system is employed in connection with the control of heating apparatus, if any leakage of the thermally expansive fluid should occur the temperature setting of the control system is raised, so that shut-off of the heating system is then effected, if at all, only after an abnormally high temperature is reached, so that a dangerous condition may be established.

It is an object of this invention to modify a control system of the character described so that when it is employed to control the operation of heating apparatus it will "fail safe," i. e., it will effect shut-off of the heating apparatus in the event of leakage of fluid from the system.

I accomplish the aforementioned object by providing a system wherein the fluid serves essentially, not as a thermally-expansive medium, but rather as a medium for transmitting the force produced by expansion and contraction of the thermal bulb.

Another object is to provide a system of the character described in the preceding paragraph and wherein said force-transmitting medium has a coefficient of thermal expansion sufficient only to offset the variation of volume of the work chamber caused by expansion and contraction of its walls with variation of ambient temperature.

For full understanding of the invention, and further appreciation of its objects and advantages, reference is to be had to the following detailed description and accompanying drawing, and to the appended claims.

The single figure of the drawing is a sectional view of a thermostatic control system embodying this invention.

Referring more particularly to the drawing, the numeral 11 indicates generally a pressure operator of the expansible-contractible bellows type which comprises a movable head or wall 12 and a fixed wall 13 interconnected by a metallic bellows 14 sealingly secured at its ends to the walls, as by solder, to define the pressure or work chamber; the top wall 13 being attached to a support 15, and the bottom wall 12 having a stem 16 for connection to a device to be operated, such as an electric switch or a fluid-control valve. The work chamber is fluidly connected by a capillary tube 17, secured in an opening through a boss 18 on the top of wall 13, to an elongated thermal bulb of metal having good thermal conductivity, such as copper or brass.

Within the thermal bulb 19 is a rod-like member 20 of material having a low coefficient of thermal expansion, such as fused quartz; the size and shape of the member being such that it nearly fills the bulb. The closed pressure system, which includes the interior of bellows 14 and capillary tube 17 and the small space remaining in the thermal bulb, is filled with a fluent force-transmitting medium indicated by numeral 21. This medium is a mixture of a liquid and finely particled solid matter having a low coefficient of thermal expansion such as silica powder, or other matter of a similar nature. The liquid may be of any kind adapted to form with the solid matter a mixture which can flow relatively freely in the system; the amount of liquid being preferably only sufficient to facilitate flow of the solid matter and to form therewith a soft plastic mixture. Liquids which I have found to be suitable are chlorinated hydrocarbons, such as chlorinated diphenyl (marketed under the trade-name of "Aroclors") which is a hydraulic medium having good lubricating properties at high and low temperatures.

The operation of the thermostatic control system of this invention is in some respects inverse to that of a conventional system. In the conventional system the fluid with which it is filled expands and contracts with variation of temperature at the thermal bulb to produce the operating force. In the present system the main function of the fluent medium is merely to transmit the force produced by the expansion and contraction of the thermal bulb relative to the quartz rod and the small amount of medium in the bulb. With rise of the controlling temperature the bulb expands so that its capacity is increased and some of the medium is withdrawn from the work chamber or bellows; the movable wall 12 accordingly rising to effect actuation of the associated control device.

It is thus apparent that leakage of fluid from the present system has the same effect as increase of temperature at the thermal bulb, so that when the system is employed for controlling the operation of heating apparatus any leakage of fluid effects reduction of heating, so that abnormal rise of temperature (which would occur with loss of fluid from a conventional system) is prevented.

No spring for aiding return of the movable wall 12 upon decrease of pressure in the work chamber, and which may be adjusted to determine the control setting, has been shown since such means are usually incorporated in the operated device.

The fluent medium 21 has a relatively low coefficient of thermal expansion because of the large amount of silica powder, or similar matter, which it contains. However, when the work chamber is formed by a metallic vessel such as the bellows 14, it is desirable that the fluent medium have a coefficient of expansion sufficient to balance the effect produced by expansion and contraction of the metallic bellows with rise and fall of ambient temperature. The chlorinated diphenyl liquid previously mentioned has an appreciable coefficient of expansion, and when it is of the small amount necessary to produce with the silica a soft plastic mixture, the expansion of this liquid component of the mixture in the work chamber is about sufficient to offset the expansion of a conventional metallic bellows within the usual range of ambient temperature. The fact that the medium in the bulb also has an appreciable coefficient of expansion does not materially affect the sensitivity of the system since only a very small amount of the medium is contained in the bulb.

As previously mentioned, the quartz rod 20 is preferably of such size and shape that it nearly fills the bulb; the diameter of the rod being such that there is a relatively close fit between the rod and the bulb at the minimum operating temperature. Instead of employing a quartz rod, the bulb could be filled with pieces of similar material large enough that they could not enter the capillary tube; however, the arrangement shown is preferred when the fluent medium has an appreciable coefficient of expansion since in this arrangement there is a minimum amount of space in the bulb for the medium.

While there has been shown in the drawing, by way of example, a bellows arrangement wherein the fluid is inside the bellows so that the same expands with increase of pressure in the system, it is obvious that the invention is equally applicable to systems which employ such as (1) a bellows arrangement of the kind wherein the pressure is applied to the outside of the bellows so that it contracts with increase of pressure, (2) a flexible diaphragm, or (3) a piston having a seal of the O-ring type.

The specific embodiment of my invention herein shown and described is therefore to be considered as merely illustrative and not as limiting the scope of the appended claims.

I claim as my invention:

1. In a thermostatic control system: means, at least in part of metal, defining a work chamber having a wall movable in response to variation of pressure in the chamber; a metallic thermal bulb adapted to be subjected to the controlling temperature; means interconnecting said bulb and said work chamber so as to form therewith a closed pressure system, and including means defining a restricted passage; solid matter, having a low coefficient of thermal expansion, within said bulb; said solid matter being of an amount such as to nearly fill the bulb, and of such size that it cannot pass through said restricted passage; and a fluent force-transmitting medium filling said pressure system; the fluid capacity of said bulb relative to that of said work chamber being such that the amount of said medium in the work chamber is greatly in excess of that in the bulb; said medium being a mixture comprising a nonmetallic liquid, and solid matter having a low coefficient of thermal expansion and so finely particled that it can flow freely throughout the system; said liquid having a coefficient of thermal expansion of such degree, and being of such amount in said mixture in said work chamber, that variation of volume of the chamber, caused by expansion and contraction of said metallic part of said chamber-defining means with variation of ambient temperature at the same, is substantially balanced by the accompanying change of volume of the medium in the chamber, so that no significant movement of said wall is produced by said variation of ambient temperature.

2. The combination defined in claim 1, and wherein said work-chamber defining means is in the form of a metallic expansible-contractible bellows.

References Cited in the file of this patent

UNITED STATES PATENTS

| | | |
|---|---|---|
| 883,159 | Fournier | Mar. 29, 1908 |
| 2,392,613 | Persons | Jan. 8, 1946 |

FOREIGN PATENTS

| | | |
|---|---|---|
| 11,798 | Great Britain | 1910 |
| 526,378 | France | June 30, 1921 |
| 574,250 | Great Britain | Dec. 28, 1945 |